(12) United States Patent
Chou et al.

(10) Patent No.: US 9,013,887 B2
(45) Date of Patent: Apr. 21, 2015

(54) DISPLAY DEVICE

(75) Inventors: Chih-Sheng Chou, Taipei Hsien (TW); Chia-Lun Yeh, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 237 days.

(21) Appl. No.: 13/485,088

(22) Filed: May 31, 2012

(65) Prior Publication Data

US 2013/0027900 A1 Jan. 31, 2013

(30) Foreign Application Priority Data

Jul. 29, 2011 (TW) .............................. 100127076 A

(51) Int. Cl.
*H05K 5/00* (2006.01)
*G06F 1/16* (2006.01)

(52) U.S. Cl.
CPC ............ *G06F 1/1601* (2013.01); *G06F 1/1626* (2013.01); *G06F 1/1637* (2013.01); *G06F 2200/1612* (2013.01)

(58) Field of Classification Search
USPC ................. 361/759, 799, 807, 809, 810, 753; 455/575.1–575.4
See application file for complete search history.

(56) References Cited

U.S. PATENT DOCUMENTS

| | | | |
|---|---|---|---|
| 5,008,487 A * | 4/1991 | Shimmyo ...................... 174/373 |
| 5,746,609 A * | 5/1998 | Franks, Jr. ...................... 439/92 |
| 6,392,723 B1 * | 5/2002 | Sugiyama et al. .............. 349/58 |
| 6,411,352 B1 * | 6/2002 | Kim ................................ 349/58 |
| 6,430,039 B2 * | 8/2002 | Nakajima et al. ......... 361/679.27 |
| 6,971,395 B2 * | 12/2005 | Edwards et al. .............. 128/898 |
| 6,975,368 B2 * | 12/2005 | Lee ................................ 349/58 |
| 7,170,759 B2 * | 1/2007 | Soga ............................ 361/825 |
| 8,437,120 B2 * | 5/2013 | Lee et al. ................. 361/679.01 |
| 2005/0212982 A1 | 9/2005 | Soga |

FOREIGN PATENT DOCUMENTS

CN 1598668 A 3/2005

OTHER PUBLICATIONS

Taiwan Office Action for Taiwan Application No. 100127076 dated Sep. 26, 2014 with English Translation.

* cited by examiner

*Primary Examiner* — Hung S Bui
(74) *Attorney, Agent, or Firm* — Muncy, Geissler, Olds & Lowe, P.C.

(57) ABSTRACT

A display device includes a panel module, a frame, and a fixing device, wherein the panel module has a panel connecting part. The frame has a frame connecting part whose location corresponds to the location of the panel connecting part. The fixing device includes a joint unit and a fixing unit. The joint unit is used for accommodating the panel connecting part and the frame connecting part. The fixing unit is connected to the joint unit such that the frame can be fixed on the panel module.

12 Claims, 6 Drawing Sheets

DISPLAY DEVICE

BACKGROUND OF THE INVENTION

1. Field of the Invention

The present invention relates to a display device; more particularly, the present invention relates to a display device whose frame and panel module can be fixed by a fixing device.

2. Description of the Related Art

Due to advances in technology, many electronic devices, such as cell phones or tablets, are equipped with a touch panel for users to operate. Using a tablet assembly as an example, the prior art for the assembly of a touch panel for a tablet includes the following steps: first, combining a touch module of a touch panel with an outer frame of a tablet, which is accomplished by the panel manufacturer; second, transferring it to an assembly plant for completion of the combination of a display screen and the outer frame of the tablet. In order to facilitate the assembly, the back of the outer frame has a protruding screw hole and the display screen has a connecting part whose position corresponds to the protruding screw hole. During the assembly, a screw can pass through the connecting part and then combine with the screw hole. In this way, the outer frame is combined with the display screen consequently.

Nowadays, the panel manufacturer has employed a new assembly method, i.e., combining the touch module with the display screen first to form a touch panel module and then transferring the touch panel module to the assembly plant for the outer frame assembly. However, the touch module and the outer frame cannot be combined directly under this kind assembly because the connecting part of the display screen interferes with the protruding screw hole of the outer frame. Consequently, the screw hole of the outer frame and the connecting part of the display screen cannot be fixed by a screw, which is an important problem in touch panel assembly.

Therefore, it is necessary to provide a new fixing device to obviate the assembly problem.

SUMMARY OF THE INVENTION

It is an object of the present invention to provide a display device whose frame and panel module are fixed by a fixing device.

It is another object of the present invention to provide a fixing device for fixing the frame and the panel module of a display device.

To achieve the abovementioned objects, the display device of the present invention includes a panel module, a frame, and a fixing device, wherein the panel module has a panel connecting part. The frame has a frame connecting part whose position corresponds to the position of the panel connecting part. The fixing device includes a joint unit and a fixing unit. The joint unit is used for accommodating the panel connecting part and the frame connecting part. The fixing unit is connected to the joint unit such that the frame can be fixed on the panel module.

BRIEF DESCRIPTION OF THE DRAWINGS

FIG. 1 A is an enlarged schematic drawing of site A in FIG. 1.

FIG. 1 B is an enlarged schematic drawing of site B in FIG. 1.

DETAILED DESCRIPTION OF THE PREFERRED EMBODIMENT

The advantages and innovative features of the invention will become more apparent from the following detailed descriptions when taken together with the accompanying drawings.

Figure 1:
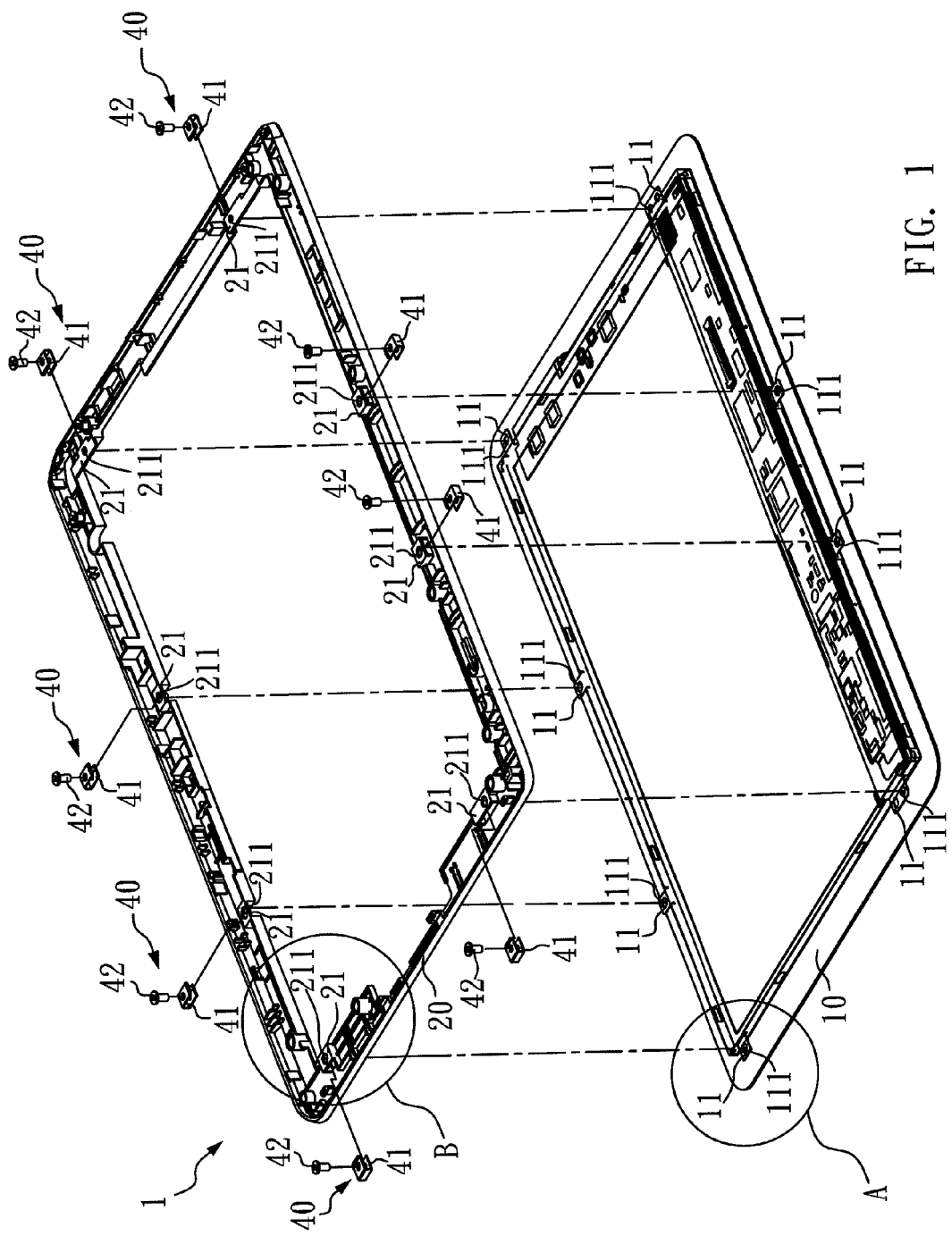
FIG. 1 is an exploded drawing of the display device of one embodiment of the present invention.
Figure 1B:
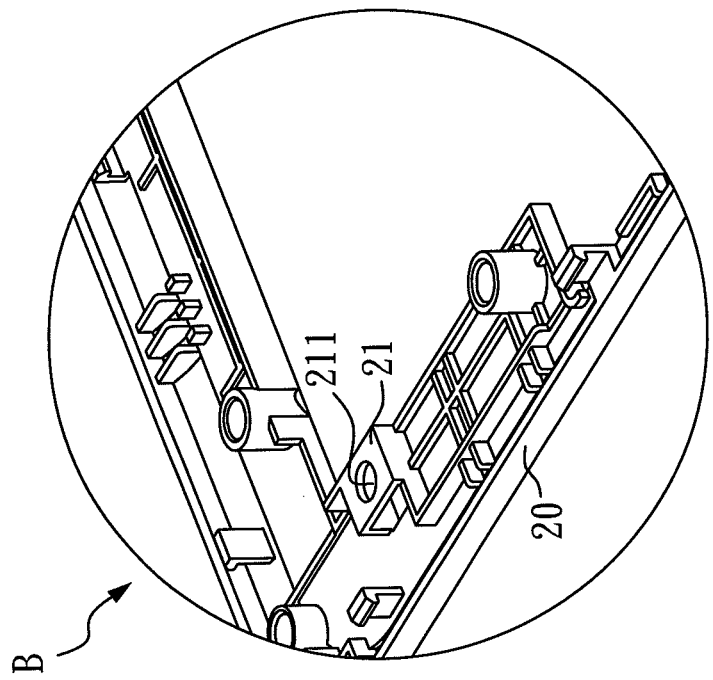
Figure 1A:
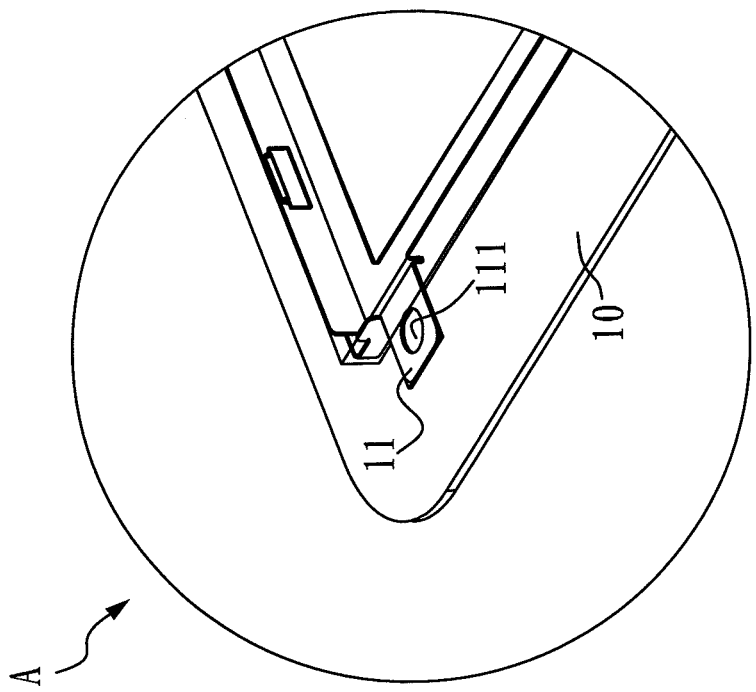
Figure 3:
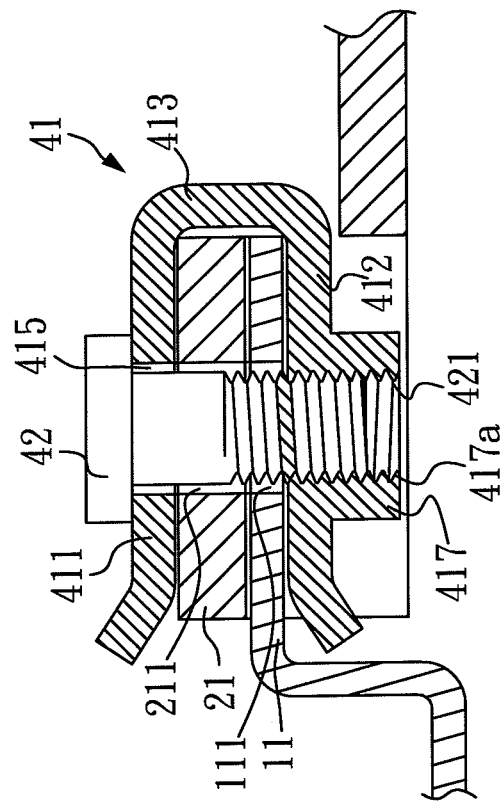
FIG. 3 is a partial cut-away schematic drawing of the display device of one embodiment of the present invention.
Figure 2:
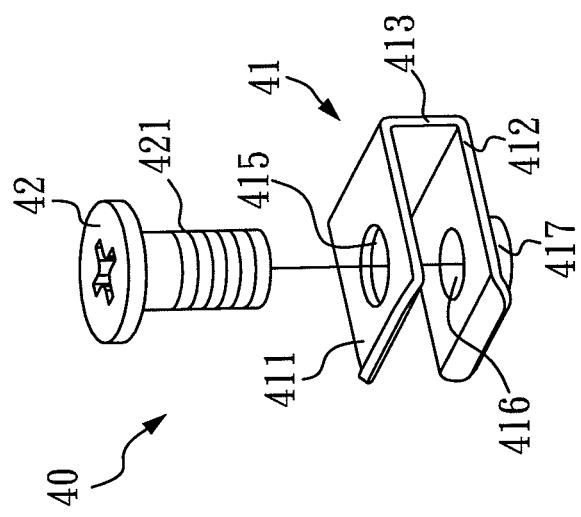
FIG. 2 is an exploded drawing of the display device of one embodiment of the present invention.

Please refer to FIG. 1~FIG. 3, FIG. 1A and FIG. 1B regarding one embodiment of the present invention, wherein FIG. 1 is an exploded drawing of the display device of one embodiment of the present invention; FIG. 1 A is an enlarged schematic drawing of site A in FIG. 1; FIG. 1 B is an enlarged schematic drawing of site B in the FIG. 1; FIG. 2 is an exploded drawing of the display device of one embodiment of the present invention; and FIG. 3 is a partial cut-away schematic drawing of the display device of one embodiment of the present invention.

As shown in FIG. 1, FIG. 1A, and FIG. 1B, one embodiment of the display device 1 of the present invention comprises a panel module 10, a frame 20, and a fixing device 40, wherein the panel module 10 comprises a panel connecting part 11 and a panel connecting part hole 111, as shown in FIG. 1A. The frame 20 comprises a frame connecting part 21 and a frame connecting part hole 211, as shown in FIG. 1B, wherein the frame connecting part 21 is situated at a position corresponding to the panel connecting part 11, and the frame connecting part hole 211 is situated at a position corresponding to the panel connecting part hole 111. The fixing device 40 comprises a joint unit 41 and a fixing unit 42, wherein the joint unit 41 is used for accommodating the panel connecting part 11 and the frame connecting part 21. The fixing unit 42 passes through the panel connecting part hole 111 and the frame connecting part hole 211 and then combines with the joint unit 41 such that the frame 20 can be fixed on the panel module 10. According to one embodiment of the present invention, the display device 1 of the present invention can be a tablet and the panel module 10 is a touch panel module that has a LCD display screen and a touching module. However, the present invention is not limited to that; the display device 1 of the present invention can be a flat panel display or other display devices with display screens.

As shown in FIG. 1, according to one embodiment of the present invention, the panel module 10 of the display device 1 of the present invention has eight panel connecting parts 11; the frame 20 has eight frame connecting parts 21 and eight fixing devices 40. The joint unit 41 of each fixing device 40 is used for accommodating the corresponding panel connecting part 11 and the corresponding frame connecting part 21. The fixing unit 42 of each fixing device 40 passes through the corresponding panel connecting part hole 111 and the corresponding frame connecting part hole 211, and then combines with the corresponding joint unit 41 such that the frame 20 of the display device 1 of the present invention can be fixed on the panel module 10. It is noted that the quantity of the panel connecting parts 11, the frame connecting parts 21, and the fixing devices 40 are not limited to the abovementioned embodiment.

As shown in FIG. 2 and FIG. 3, the fixing device 40 of one embodiment of the display device 1 of the present invention comprises a joint unit 41 and a fixing unit 42, wherein the fixing unit 42 is used for combining with the joint unit 41. The appearance of the joint unit 41 of the present invention is a U-shape, and the shape of the open end of the U-shape is a trumpet-like shape such that the panel connecting part 11 and the frame connecting part 21 can be inserted and accommodated in the joint unit 41 smoothly.

As shown in FIG. 2 and FIG. 3, the joint unit 41 of the present invention comprises a first sheet 411, a second sheet 412, a bending sheet 413, a first hole 415, a second hole 416, and a protrusion part 417. The bending sheet 413 of the joint unit 41 is situated between the first sheet 411 and the second sheet 412. As shown in FIG. 3, the panel connecting part 11 and the frame connecting part 21 can be accommodated between the bending sheet 413, the first sheet 411, and the second sheet 412. The first hole 415 is situated on the first sheet 411, and its position corresponds to the panel connecting part hole 111. The second hole 416 is situated on the second sheet 412 and its position corresponds to the first hole 415 for allowing the fixing unit 42 to pass through. The protrusion part 417 is connected to the second hole 416 and used for combining with the fixing unit 42.

As shown in FIG. 3, when the fixing device 40 is connected to the panel connecting part 11 and the frame connecting part 21, the panel connecting part 11 and the frame connecting part 21 are clamped by the joint unit 41; meanwhile, the fixing unit 42 passes through the first hole 415, the panel connecting part hole 111, the frame connecting part hole 211, and the second hole 416 and then combines with the protrusion part 417. According to one embodiment of the present invention, the fixing unit 42 is a screw with a screw thread 421; the protrusion part 417 of the joint unit 41 has an internal thread 417a for combining with the screw thread 421 of the fixing unit 42 such that the frame 20 and the panel module 10 of the display device 1 of the present invention can be combined and fixed.

Figure 4:
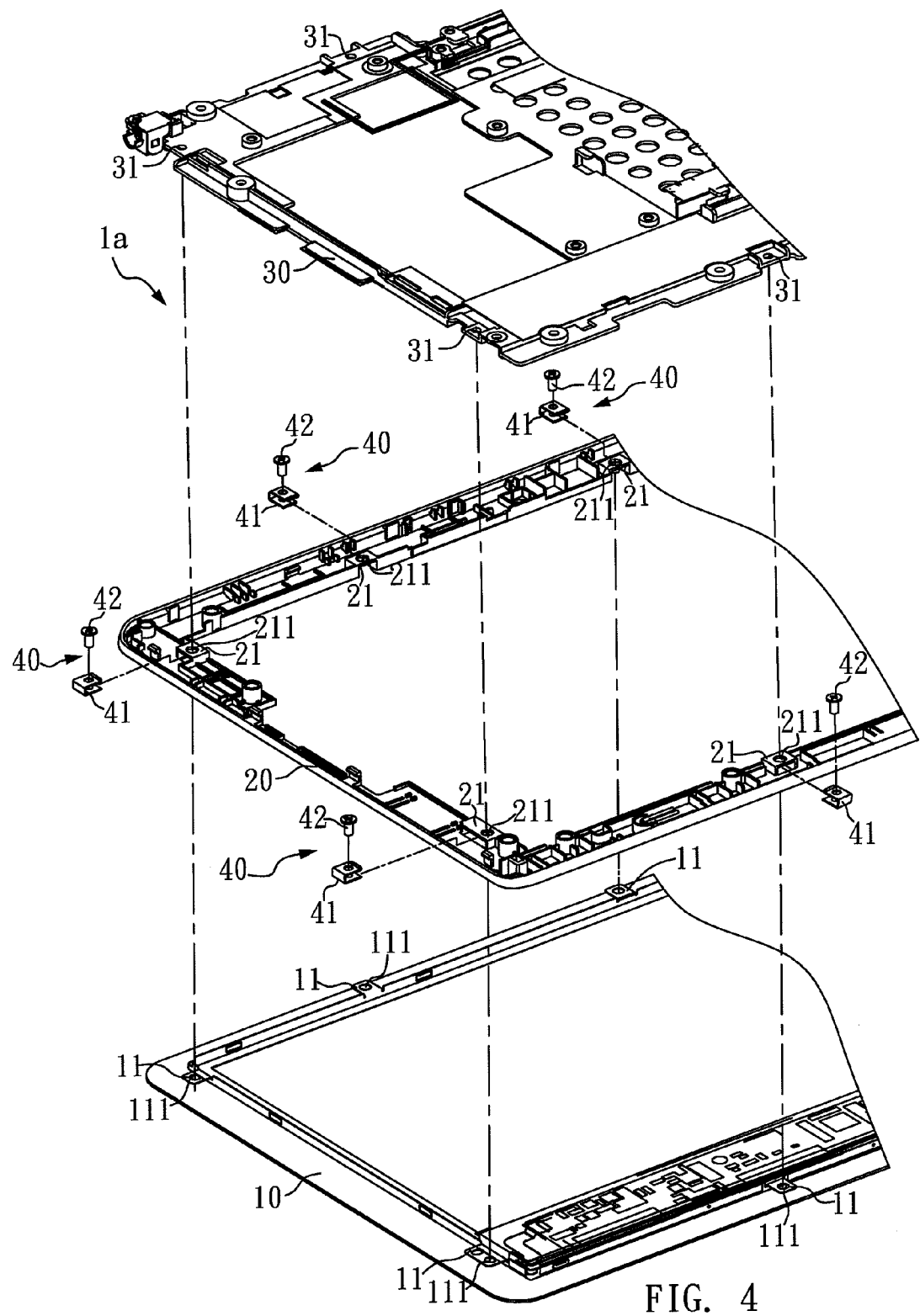
FIG. 4 is an exploded drawing of the display device of another embodiment of the present invention.
Figure 5:
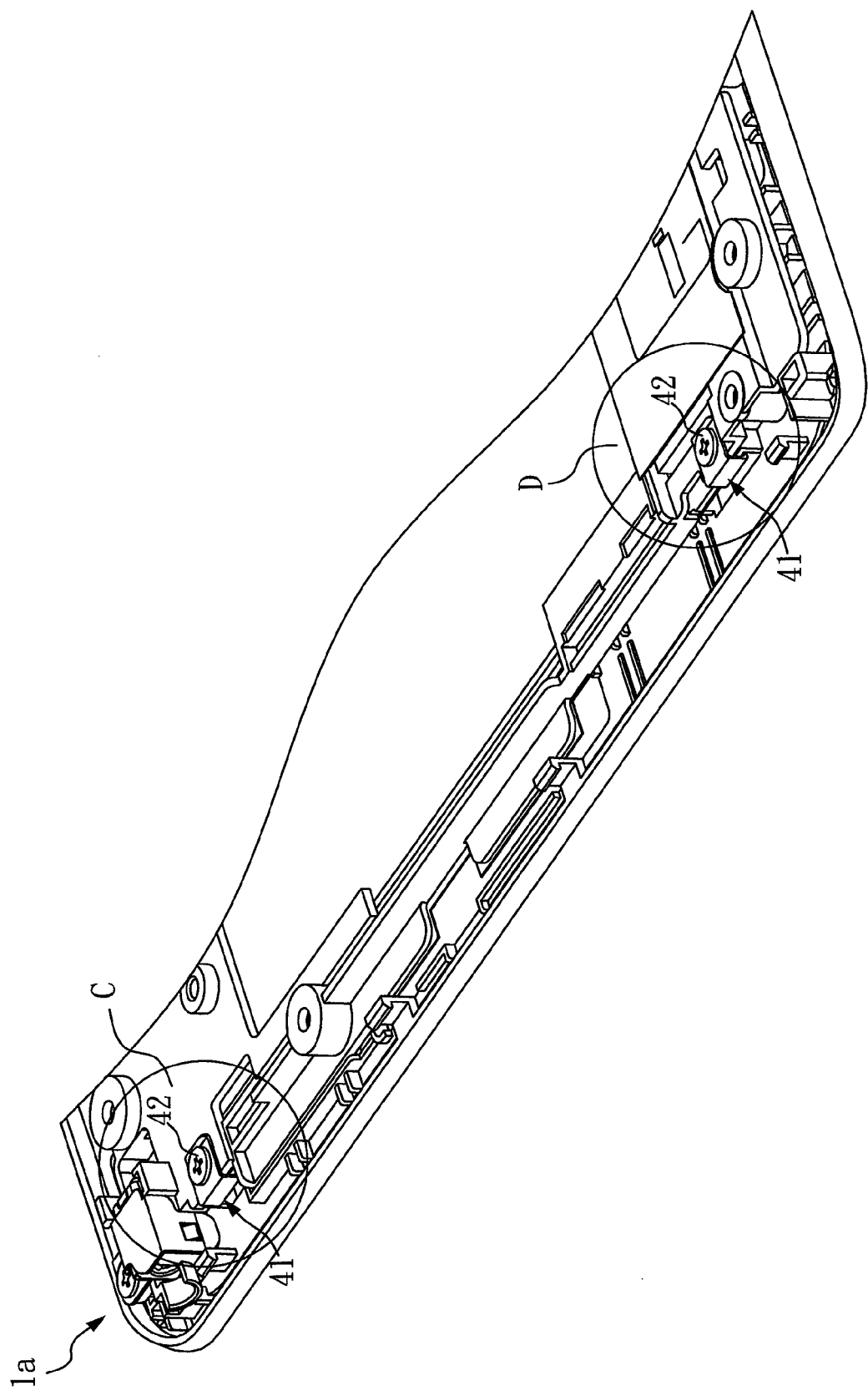
FIG. 5 is a partial cut-away schematic drawing of the display device of another embodiment of the present invention.
Figure 6:
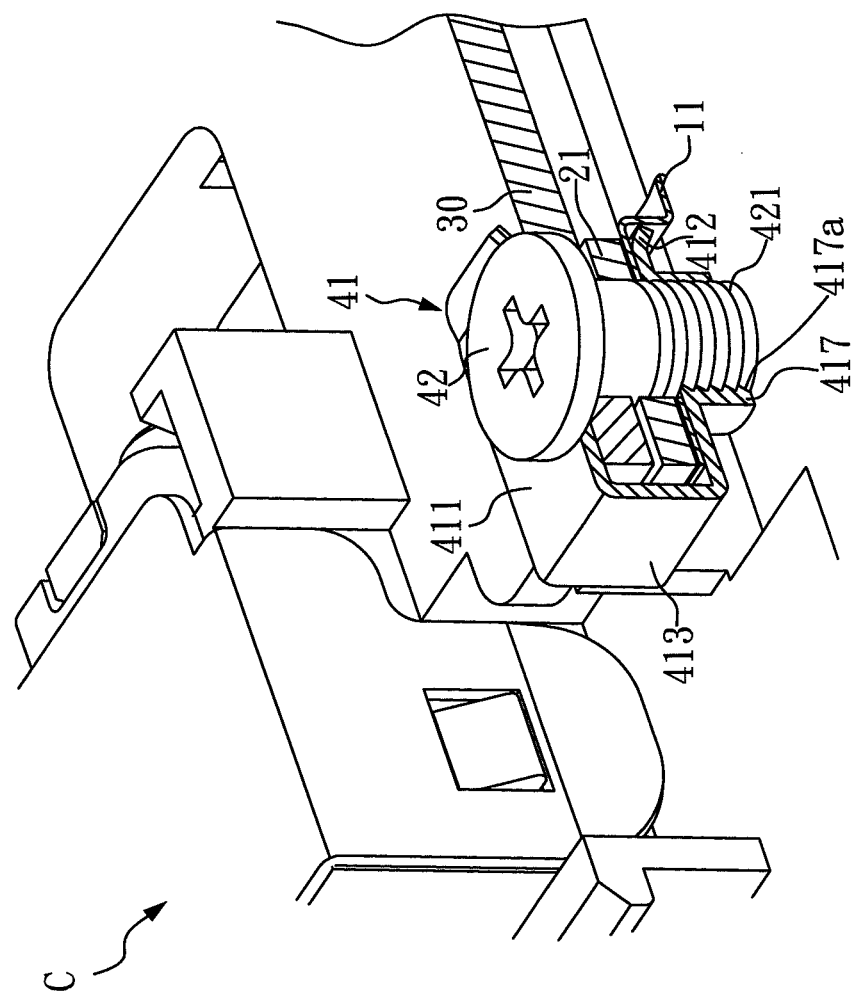
FIG. 6 is an enlarged schematic drawing of site C in FIG. 5.

Please refer to FIG. 4~FIG. 6 regarding another embodiment of the present invention, wherein FIG. 4 is an exploded drawing of the display device of another embodiment of the present invention; FIG. 5 is a partial cut-away schematic drawing of the display device of another embodiment of the present invention; and FIG. 6 is an enlarged schematic drawing of site C in FIG. 5.

As shown in FIG. 4~FIG. 6, the most noticeable difference between the display device 1a of another embodiment of the present invention and the display device 1 of one embodiment of the present invention is: the display device 1a of another embodiment of the present invention further comprises a metal rack 30 that is situated above the frame 20. The metal rack 30 has a hole 31 which is situated at a position corresponding to the frame connecting part hole 211. In this embodiment, the panel connecting part 11, the frame connecting part 21, and part of the metal rack 30 can all be accommodated in the joint unit 41. The fixing unit 42 passes through the panel connecting part hole 111, the frame connecting part hole 211, and the hole 31, and then combines with the joint unit 41 (shown in site C and site D in FIG. 5), such that the metal rack 30 and the frame 20 can be fixed on the panel module 10. According to one embodiment of the present invention, the metal rack 3 is, but is not limited to, an iron rack. The metal rack 30 can be made of an aluminum magnesium alloy or other metal materials.

An enlarged schematic drawing of site C in FIG. 5 is shown in FIG. 6. In FIG. 6, the fixing unit 42 of the display device 1a of the present invention passes through the first sheet 411, the metal rack 30, the frame connecting part 21, and the panel connecting part 11, and then combines with the protrusion part 417. According to one embodiment of the present invention, the fixing unit 42 is a screw with a screw thread 421; the protrusion part 417 of the joint unit 41 has an internal thread 417a for combining with the screw thread 421 of the fixing unit 42 such that the metal rack 30, the frame 20, and the panel module 10 of the display device 1 of the present invention can be combined and fixed.

It must be noted that the above-mentioned embodiments are only for illustration. It is intended that the present invention covers modifications and variations of this invention provided that they fall within the scope of the following claims and their equivalents. Therefore, it will be apparent to those skilled in the art that various modifications can be made to the structure of the present invention without departing from the scope or spirit of the invention.

What is claimed is:

1. A display device comprising:
   a panel module with a panel connecting part;
   a frame with a frame connecting part whose position corresponds to the panel connecting part; and
   a fixing device that comprises:
      a joint unit for accommodating the panel connecting part and the frame connecting part comprising a first sheet, a second sheet, and a bending sheet, wherein the bending sheet is situated between the first sheet and the second sheet, the panel connecting part and the frame connecting part are both situated between the first sheet, the second sheet, and the bending sheet, wherein an open end of the joint unit is a trumpet-like shape; and
      a fixing unit which can be combined with the joint unit for fixing the frame on the panel module.

2. The display device as claimed in claim 1, wherein the appearance of the joint unit is a U-shape.

3. The display device as claimed in claim 1, wherein the display device further comprises a metal rack situated above the frame and on which there is a hole whose position corresponds to the frame connecting part hole.

4. The display device as claimed in claim 3, wherein the fixing unit passes through the first sheet, the metal rack, the frame connecting part, and the panel connecting part, and then combines with the protrusion part.

5. The display device as claimed in claim 1, wherein the joint unit further comprises a first hole and a second hole, wherein the first hole is situated on the first sheet and the second hole is situated on the second sheet that corresponds to the first hole.

6. The display device as claimed in claim 5, wherein the joint unit further comprises a protrusion part which is connected to the second hole and can be combined with the fixing unit.

7. The display device as claimed in claim 6, wherein the panel connecting part further comprises a panel connecting part hole and whose position corresponds to the first hole.

8. The display device as claimed in claim 7, wherein the frame connecting part further comprises a frame connecting part hole and whose position corresponds to the panel connecting part hole.

9. The display device as claimed in claim 8, wherein the fixing unit passes through the first hole, the panel connecting part hole, the frame connecting part hole, and the second hole, and then combines with the protrusion part.

10. The display device as claimed in claim 9, wherein the fixing unit is a screw with a screw thread and the protrusion part of the joint unit has an internal thread for combining with the screw thread of the fixing unit.

11. The display device as claimed in claim 10, wherein the display device further comprises a metal rack situated above the frame, on which there is a hole situated in a position which corresponds to the frame connecting part hole.

12. The display device as claimed in claim 11, wherein the fixing unit passes through the first sheet, the metal rack, the frame connecting part, and the panel connecting part, and then combines with the protrusion part.

* * * * *